No. 786,366. PATENTED APR. 4, 1905.
D. DE LANCEY & H. M. SMITH.
BEARING FOR ELECTRIC METERS.
APPLICATION FILED SEPT. 17, 1903.

Witnesses
Geo. V. Rasmussen
L. Vreeland

Darragh de Lancey  Inventors
Herbert M. Smith
By their Attorney
R. C. Mitchell

No. 786,366.

Patented April 4, 1905.

UNITED STATES PATENT OFFICE.

DARRAGH DE LANCEY AND HERBERT M. SMITH, OF GREAT BARRINGTON, MASSACHUSETTS, ASSIGNORS TO STANLEY INSTRUMENT COMPANY, OF GREAT BARRINGTON, MASSACHUSETTS, A CORPORATION OF MASSACHUSETTS.

BEARING FOR ELECTRIC METERS.

SPECIFICATION forming part of Letters Patent No. 786,366, dated April 4, 1905.

Application filed September 17, 1903. Serial No. 173,561.

*To all whom it may concern:*

Be it known that we, DARRAGH DE LANCEY and HERBERT M. SMITH, citizens of the United States, residing at Great Barrington, Berkshire county, and State of Massachusetts, have invented certain new and useful Improvements in Bearings for Electric Meters, of which the following is a full, clear, and exact description.

Our invention relates to improvements in bearings for electric meters and similar apparatus, and has for its object to provide a yielding bearing which is simple in construction and inexpensive to manufacture and which permits the use of a larger spring than is possible in bearings as now constructed and also gives a longer range for the spring, thereby permitting dispensing with the clamp which is ordinarily used for supporting the pivot from the jewel or bearing-surface when meters are shipped.

The following is a description of our invention, reference being had to the accompanying drawings, in which—

Figure 1:
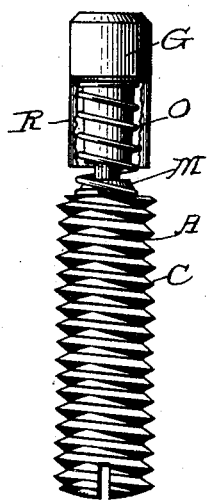
Figure 2:
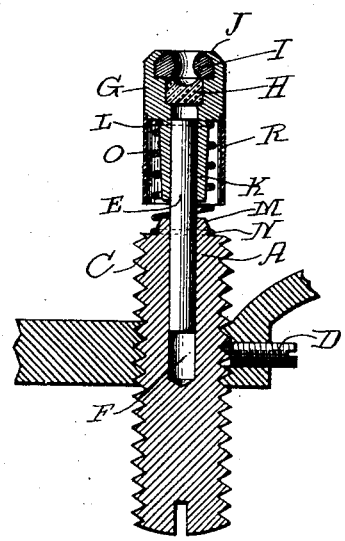
Figure 3:
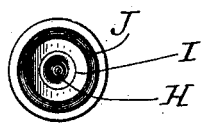
Figure 4:
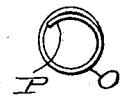

Figure 1 is a side elevation of the bearing, partly being broken away. Fig. 2 is a longitudinal section of the same. Fig. 3 is a plan view. Fig. 4 is a plan view of the spring detached.

Referring more particularly to the drawings, A represents a jewel-holder support which is inserted in the meter-casing B and secured thereto by screw-threads C thereon, engaging with a corresponding screw-threaded opening in the meter-case and the set-screw D or by either of these or other suitable means. E is a pin which is firmly fixed in an opening F in said support A.

G is a jewel-holder having a jewel H held within it by a bushing I, which bushing is held in place by a spun edge J. The holder G is provided with an extension K, slightly tapered and having near or at its enlarged end a small groove L. The support A also has a projection M, which is slightly tapered and is provided at or near its enlarged end with a small groove N.

O is a spring having each of its ends P bent in slightly. Within the ends of this spring the tapered projections K and M are forced until the bent-in ends P snap into the grooves L and N. The spring then acts to permit the holder G to have a yielding motion and at the same time holds the parts A and G together. The holder G is made with a slightly-smaller diameter than the hole in the casing through which the support is inserted, so that the complete bearing can be removed from the casing through that opening.

The upper part of the pin E may be of any regular shape, round or polygonal, so as to fit within the round bore of the holder G.

If desired, a depending petticoat R may be secured to the enlarged portion of the part G to cover the spring O.

From the foregoing it will be seen that the construction is very simple and inexpensive to manufacture, the work being such as can readily be performed upon machines by unskilled labor. It will also be seen that the spring O can be made much larger in diameter than it could be if it were inserted within an opening in the part A (a construction sometimes used) and that the range of the spring can be made very considerable. It will also be noted that the assembling of the parts is a matter of great simplicity, the same being held together by a simple snapping of the ends P in grooves upon the two relatively movable members. Not only is the assembling simple, but the construction enables the holder G to be easily removed in case it is desired, and that, too, even without removing the support A from the meter.

The embodiment of our invention permits of various modifications of what we have shown and described. Thus other means may be provided for holding support A within the casing B and for other details, the broad principle of our invention being the use of a jewel-holder supported by an external spring and carried by a proper support so as not to have lateral movement.

What we claim is—

1. In a thrust-bearing for electric measuring instruments, the combination of a bearing-surface holder having a depending tapered projection thereon with a groove at the enlarged end thereof, a support for said bearing-surface holder having a tapered projection thereon with a groove at the enlarged end of said tapered projection, and a spring engaging said grooves and holding said support and bearing-surface holder together.

2. In a thrust-bearing for electric measuring instruments, the combination of a support having a pin extending from the upper end thereof, a bearing-surface holder having a recess fitting loosely over said pin and a spring between said bearing-surface holder and the body of said support.

3. In a thrust-bearing for electric measuring instruments, the combination of a support, provided with a tapered projection having a groove at its enlarged end, a pin extending upwardly therefrom, a bearing-surface holder having a depending tapered projection with a groove near its enlarged end and a recess therein fitting over said pin and a spring surrounding said pin and said projections and having its ends engaging with said grooves.

4. In a thrust-bearing for electric measuring instruments, the combination of a support, a bearing-surface holder, means external of said support for yieldingly connecting said bearing-surface holder to said support and a depending petticoat attached to said bearing-surface holder and surrounding said means.

5. In a thrust-bearing for electric measuring instruments, the combination of a support, a bearing-surface holder, a spring furnishing a yielding connection between said holder and said support, said support and holder having means for securing said spring, consisting of tapered projections having a recess at its enlarged end into which the ends of said spring snap, there being means for securing said support in the meter-casing.

Signed at Great Barrington, Massachusetts, this 14th day of September, 1903.

DARRAGH DE LANCEY.
HERBERT M. SMITH.

Witnesses:
JNO. J. WELSH,
A. R. RYAN.